Patented Aug. 12, 1947

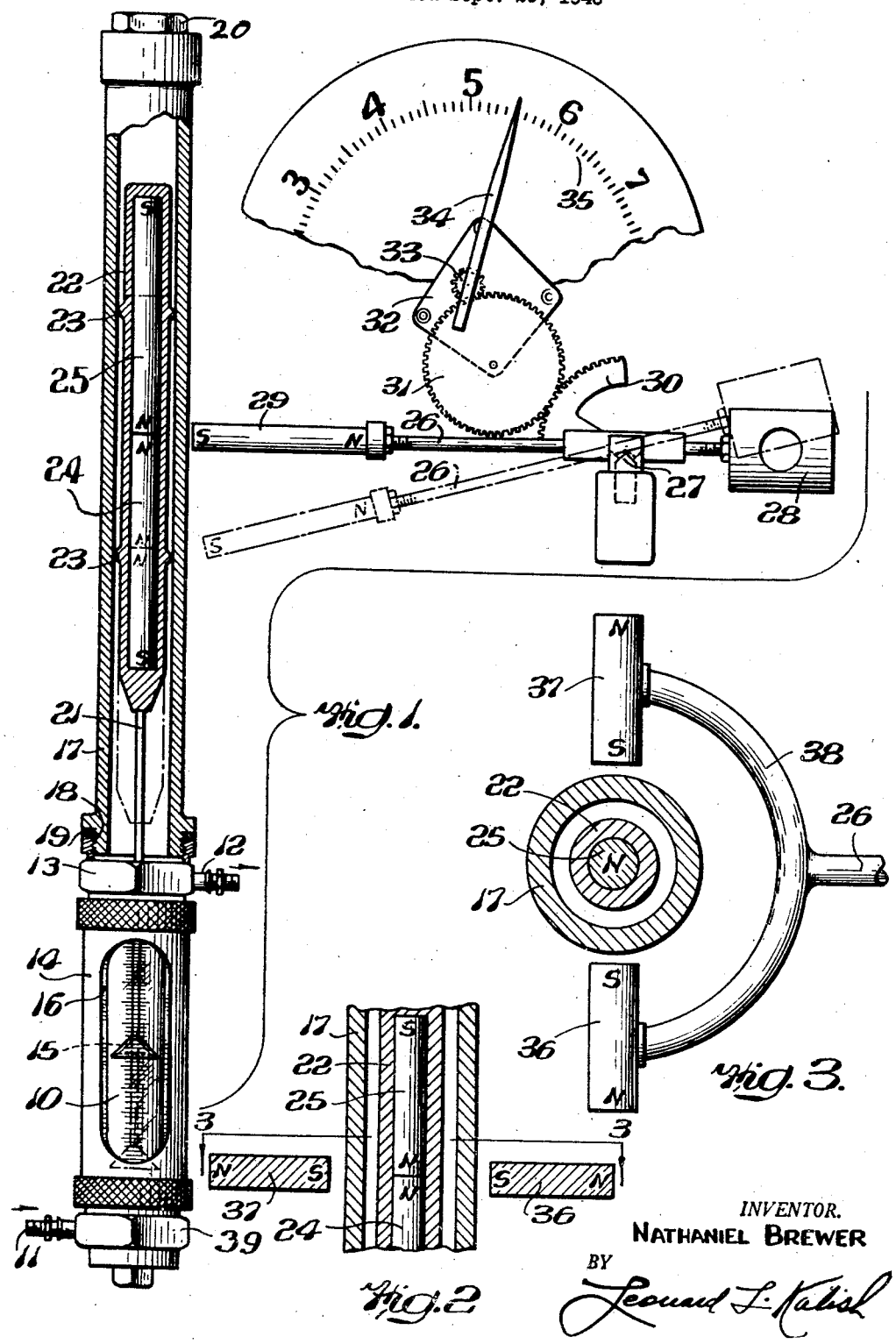

2,425,691

UNITED STATES PATENT OFFICE 2,425,691

MAGNETIC COUPLE FOR FLOWMETERS OR THE LIKE

Nathaniel Brewer, Newtown, Pa., assignor to Fischer & Porter Company, Hatboro, Pa., a corporation of Pennsylvania Application September 25, 1945, Serial No. 618,539

11 Claims. (Cl. 73—209)

The present invention relates to a certain new and useful magnetic coupling device and it relates more particularly to a magnetic coupling device adapted for use with flow meters or other similar devices having a movable element sensitive to variations in a variable condition.

An object of the present invention is to provide a new and improved magnetic coupling device. Another object of the present invention is to provide a magnetic coupling device adapted for use with flow meters or with other similar devices having a movable element sensitive to variations in a variable condition. Still another object of the present invention is to provide a new and improved magnetic coupling device for use with a rotameter or the like and which is capable of accurately remotely indicating the position of the rotameter float under all ordinary operating conditions. A further object of the present invention is to provide a magnetic couple for a rotameter float or the like which will not "lose" the float and which will accurately follow the float regardless of sudden movements thereof caused by "surging," etc.

Other objects and advantages of the present invention are apparent in the following detailed description, appended claims and accompanying drawings.

It has been suggested in the past to provide magnetic coupling devices for remote indication of the position of a rotameter float or other movable metering element sensitive to variations in a variable condition; as for example, temperature, pressure, rate-of-flow, etc.

Thus in my co-pending application Serial No. 511,493 filed November 23, 1943, I have shown a rotameter wherein the metering float carries a magnet and wherein follower magnets are mounted outside the metering tube upon one end of a counter-weighted lever so that vertical movements of the rotameter float responsive to variations in the fluid rate-of-flow through the rotameter cause tilting of the lever; tilting of the lever in turn, operating automatic valve control mechanism tending to re-establish the predetermined rate-of-flow.

While this magnetic coupling works satisfactorily under most operating conditions, it has not been entirely dependable when used in fluid systems wherein conditions of violent "surging" occur.

That is, in the conventional magnetic coupling device heretofore employed wherein the movable metering element carries a single magnet (or a body of magnetic material such as iron or iron-nickel alloy), the field of magnetic force which couples the outer lever to the float is relatively small. Thus, under conditions of violent "surging," the float is apt to jump or move suddenly a distance sufficient to break the magnetic couple between the lever and the float. Should this happen, of course, the lever will no longer indicate the position of the float and, as a result, the remote indicating and/or controlling mechanism actuated by the position of the lever will not function properly.

Accordingly, the present invention contemplates a new and improved magnetic coupling device which will positively couple the movable metering element to the follower element under all normal operating conditions and which will prevent breaking of the magnetic couple even under conditions of violent "surging" or the like.

Generally speaking, the present invention contemplates providing the rotameter float or other movable metering element with a pair of co-axial elongated bar magnets mounted with their similar poles in juxtaposition and further contemplates providing the follower with one or more magnets having poles magnetically opposite to the juxtaposed poles of the float magnets disposed adjacent the path of travel of said float magnets. Thus, for example, the float can be provided with a pair of co-axial elongated bar magnets having juxtaposed north poles and the follower can be provided with one or more bar magnets having south poles disposed adjacent the path of travel of the float magnets. In this way, not only do the juxtaposed similar poles of the float magnets exert a stronger field of attraction for the opposite poles of the follower magnets but also the outer poles of the follower magnets (being the same as the adjacent poles of the follower magnets) tend to repel the follower magnets and thereby tend to force the follower magnets along with the float magnets under conditions of violent "surging."

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1 represents a view, partly in elevation and partly in vertical cross-section, of one embodiment of the present invention.

Figure 2 represents a fragmentary vertical cross-sectional view of a modified form of the present invention.

Figure 3 represents a fragmentary horizontal cross-sectional view generally along the line 3—3 of Figure 2.

In one embodiment shown generally in Figure 1, I may provide a rotameter having a downwardly-tapered vertical metering tube 10 and having inlet and outlet connections 11 and 12 formed in the lower and upper heads or fittings 39 and 13 respectively; the fittings 39 and 13 being mounted upon the casing or body 14 of the rotameter so as to permit independent universal horizontal positioning thereof.

The downwardly-opening conical cup-shaped flow-constricting head 15 of a metering float is disposed within the tube 10; the position of the head 15 within the tube 10 being determined by the rate-of-flow of fluid upward through said tube in a manner well known in the art.

The body 14 may be provided with a window 16 to permit observation of the position of the head 15 and suitable calibrations may be provided (either directly on the tube 10 or on a vertical scale fastened adjacent said tube) whereby the height of the float can be read off (either in arbitrary units or directly in "gallons per hour," or "liters per minute," or other suitable units).

An elongated cylindrical extension chamber 17 of non-magnetic material is screw-threadedly attached, as at 18, to the upper fitting 13; a gasket 19 providing a fluid-tight seal therebetween.

A plug 20 is screw-threadedly fastened in the upper end of the chamber 17 which communicates, at its lower end, with the metering tube 10 so that said chamber 17 is, at all times, filled with the fluid being metered.

The metering float is provided with a thin elongated extension rod 21 which extends upwardly from the head 15 and into the chamber 17. A weight-giving body portion 22 is mounted upon the upper end of the rod 21; the body portion 22 being provided with a pair of vertically-spaced annular ribs 23 which contact the polished inner wall of the chamber 17 and serve to center the body portion 22 relative to said chamber 17. The ribs 23 are tapered to provide line-contact with the chamber 17, thereby to reduce friction and to permit free up-and-down movement of said head 15 and said body portion 22 responsive to variations in rate-flow of fluid through the metering tube 10.

The body portion 22 is of non-magnetic material (as for example, synthetic plastic, or non-magnetic light-weight metal, etc.). Within the body portion 22 are disposed lower and upper elongated bar magnets 24 and 25 respectively. The bar magnets 24 and 25 are disposed so that their north poles touch each other generally at the center of said body portion while their south poles are generally at their free ends.

A lever 26 is pivotally mounted externally of said extension chamber 17 upon a knife-edge 27 and is provided, at one end, with an adjustable counter-weight 28 for balancing. The other end of said lever 26 carries a follower bar magnet 29 which has its south pole disposed adjacent the extension chamber 17.

The lever 26 carries a sector gear 30 which is in mesh with a spur-gear wheel 31 mounted upon a supporting plate 32.

A pinion 33 is also mounted upon the supporting plate 32 and meshes with the wheel 31. An indicating pointer 34 is carried by the pinion 33 and is adapted to be rotated therewith relative to a scale 35.

It is apparent that, when the rotameter float 15 moves, responsive to variations in rate-of-flow, the body portion 22 and the magnets 24 and 25 will move vertically with it. The force of attraction of the juxtaposed north poles of the magnets 24 and 25 creates a magnetic couple with the adjacent south pole of the follower magnet 29. In this way, a vertical movement of magnets 24 and 25 will result in tilting of the lever 26.

That is, if the normal position of the float 15 and the magnets 24 and 25 is that shown in solid lines in Figure 1, it follows that a downward movement of the float 15 and the magnets 24 and 25 to the position shown in dash-dot lines, will result in a counter-clockwise rotation of the lever 26 from the generally horizontal position shown in solid lines to the position shown in dash-dot lines. This will cause a counter-clockwise rotation of the sector gear 30 and a clockwise rotation of the spur-gear wheel 31 and a counter-clockwise rotation of the pinion 33 and the pointer 34.

Conversely, an upward movement of the float 15 and the magnets 24 and 25 would result in a clockwise rotation of the lever 26 and the sector gear 30, a counter-clockwise rotation of the spur-gear wheel 31 and a clockwise rotation of the pinion 33 and the pointer 34.

As described above, it is obvious that it is virtually impossible for the follower magnet 29 to "lose" the magnets 24 and 25. This is due in part to the fact that the juxtaposed north poles of the magnets 24 and 25 exert a stronger magnetic attraction upon the south pole of the follower magnet 29 than would the conventional single float magnet heretofore employed. This is due in further part to the fact that the south poles at the lower and upper ends of the juxtaposed magnets 24 and 25 tend to repel the south pole of the follower magnet 29 should they approach one another and would thus drive the follower magnet back toward the north poles of the magnets 24 and 25.

By way of illustration, suppose both the magnets 24 and 25 and the lever 26 were in their lower position shown in dash-dot lines in Figure 1 and suppose further that due to a momentarily violent "surge" or increase in rate-of-flow the float and the magnets 24 and 25 were raised suddenly to the position shown in solid lines in Figure 1. Suppose further that this upward motion of the magnets 24 and 25 was so sudden as momentarily to leave the follower magnet 29 in the lower dash-dot position. It is apparent that, if this were to occur, the south pole of the lower magnet 24 would approach the south pole of the follower magnet 29 and would tend to repel it upward and thus to drive it to the horizontal solid-line position at which it would accurately indicate the position of the metering float 15.

In addition to, or in place of, the pointer 34, the pinion 33 could be connected to the transmitter unit of any conventional remote indicating and/or control system for remote indication and/or control of the fluid rate-of-flow. Such a remote indicating system could include an impedance circuit, such as is well known in the metering art for causing the rotation of the pinion 33 to be duplicated by another remotely-situated pointer as shown, for example, in Sundh, United States Patent Number 1,052,528.

The automatic flow controller could, for example, be of the air-operated type shown in my copending application Serial Number 533,972, filed May 3, 1944.

It is obvious that the poles of the float magnets and of the follower magnet could be reversed without departing from the spirit of the present invention. That is, the magnets 24 and 25 could be arranged so that their south poles are in juxtaposition and the follower magnet 29 could be arranged so that its north pole is adjacent the juxtaposed south poles of the magnets 24 and 25.

The length of the end-to-end magnets 24 and 25 relative to the length of the metering tube 10 further guards against accidental breaking of the magnetic couple upon violent surging or the like. That is, as can be seen in Figure 1, the magnets 24 and 25 may each have a length equal to or greater than, the useful scale length of the metering tube 10.

If the solid-line position of the metering float in Figure 1 is assumed to be the normal or average position of the float during use, it is evident that the float can move vertically up or down within the metering tube a distance less than the length of one of the magnets 24 and 25. As a result, it is virtually impossible for the magnets 24 and 25 to move up or down from the solid-line position shown in Figure 1 a distance great enough to cause the follower magnet to lose said magnets 24 and 25. That is, even if the flow-rate were to drop to the lowest figure registered by the metering float, the south pole of the bar magnet 25 would still be above the original horizontal position of the follower magnet so that the force of repulsion between the south poles of the magnets 25 and 29 would tend to drive the follower magnet downward to its correct position opposite the juxtaposed north poles of the magnets 24 and 25.

Similarly, if the flow-rate were momentarily to rise to the highest figure indicated by the rotameter float, the south pole of the magnet 24 would still be below the normal horizontal position of the follower magnet 29 so that it would tend to repel the south pole of said follower magnet upward to its correct position opposite the juxtaposed north poles of the magnets 24 and 25.

In Figures 2 and 3 I have shown a modified form of the present invention which generally resembles that of Figure 1 except for the fact that, in place of the single follower magnet 29, a pair of follower magnets 36 and 37 are carried at the ends of a generally semi-circular yoke 38 mounted upon the lever 26.

The follower magnets 36 and 37 are positioned at diametrically-opposed points external to the extension chamber 17 and have their respective south poles disposed adjacent said chamber 17. Thus, the magnetic force of the juxtaposed north poles of the magnets 24 and 25 attracts the inner south poles of the two follower magnets 36 and 37 and thereby creates a strong magnetic couple which further minimizes the possibility of the follower magnets "losing" the float magnets. Should the south poles of the magnets momentarily lose the juxtaposed north poles of the float magnets, the south poles of said float magnets will repel the south poles of the follower magnets and drive them back into aligned position with the north poles in the manner described hereinabove in connection with the embodiment of Figure 1.

As stated hereinabove in connection with the embodiment of Figure 1, the poles of the magnets could be reversed. That is, the magnets 24 and 25 could be arranged so that their south poles are in juxtaposition while the magnets 36 and 37 could be arranged so that their north poles are adjacent the extension chamber 17.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. For use with a meter for measuring variations in a variable condition and having an element movable responsive to variations in said variable condition; a pair of end-to-end magnets carried by said element and movable therewith, said magnets having their similar poles disposed substantially in juxtaposition, a tiltably-mounted lever, a follower magnet carried by said lever, said follower magnet having one pole disposed adjacent the path of travel of said first-mentioned magnets, said adjacent pole of said follower magnet being magnetically opposite to the juxtaposed similar poles of said first-mentioned magnets, whereby movement of said first-mentioned magnets causes tilting of said lever, and means actuated by tilting of said lever for indicating variations in said variable condition.

2. For use with a meter constructed and arranged to measure variations in a variable condition and having an element movable responsive to variations in said variable condition; a pair of co-axial end-to-end bar magnets carried by said element and movable therewith, said magnets having their similar poles disposed substantially in juxtaposition and having their other poles disposed at their free ends, a follower bar magnet having one pole disposed adjacent the path of travel of said first-mentioned magnets, said adjacent pole of said follower magnet being magnetically opposite to the juxtaposed similar poles of said first-mentioned magnets, a counter-weighted lever mounting for said follower magnet whereby said follower magnet can move along a generally arcuate path upon movement of said first-mentioned magnets, said juxtaposed similar poles and said adjacent opposite pole forming a magnetic couple, and means actuated by movement of said lever mounting for indicating the movements of said element.

3. In a system having a meter for measuring variations in a variable condition, said meter being provided with an element movable responsive to said variations, and having means for indicating the movements of said element; means for magnetically coupling said element to said indicating means, said coupling means including a pair of co-axial end-to-end bar magnets carried by said element and movable therewith, said magnets having similar poles disposed substantially in juxtaposition, a follower magnet having one pole disposed adjacent the path of travel of said first-mentioned magnets, said adjacent pole being magnetically opposite to said juxtaposed similar poles and forming a magnetic couple therewith, a counter-weighted lever mounting for said follower magnet whereby said follower magnet can move responsive to movements of said first-mentioned magnets, and means operatively connecting said lever mounting to said indicating means for actuating said indicating means responsive to tilting of said lever mounting.

4. In a system having a meter for measuring variations in a variable condition, said meter being provided with an element movable responsive to said variations, and having means for indicating the movements of said element; means for magnetically coupling said element to said indicating means, said coupling means including a pair of co-axial end-to-end bar magnets carried by said element and movable therewith, said magnets having similar poles disposed substantially in juxtaposition, a counter-weighted lever having a yoke at one end thereof, a pair of follower magnets mounted on said yoke and having similar poles disposed adjacent the path of travel of said first-mentioned magnets, the adjacent poles of said follower magnets being magnetically opposite to the juxtaposed poles of said first-mentioned magnets and forming a magnetic couple therewith whereby said follower magnets will move with said first-mentioned magnets to cause tilting of said lever, and means for actuating said indicating means responsive to tilting of said lever.

5. In a system having a movable primary element and having a movable secondary element; means for magnetically coupling said secondary element to said primary element whereby said secondary element will move responsive to movements of said primary element, said coupling means including a pair of co-axial end-to-end bar magnets carried by said primary element and movable therewith and having similar poles disposed substantially in juxtaposition, a movably mounted follower magnet having a pole disposed adjacent the path of travel of said first-mentioned magnets, said adjacent pole being magnetically opposite to said juxtaposed poles and forming a magnetic couple therewith, and means for actuating said secondary element responsive to movements of said follower magnet.

6. For use with a rotameter having a vertical metering tube and having a metering float disposed for up-and-down movement responsive to variations in rate-of-flow of fluid through said metering tube; a pair of co-axial end-to-end bar magnets carried by said float, said magnets having similar poles disposed substantially in juxtaposition, a follower bar magnet having one pole disposed adjacent the path of travel of said float magnets, said adjacent pole being magnetically opposite to said juxtaposed poles and forming a magnetic couple therewith, a counter-weighted lever mounting for said follower magnet whereby said follower magnet can move along an arcuate path responsive to movements of said float magnets, and an indicator operatively connected to said lever mounting and adapted to be actuated upon tilting of said lever mounting.

7. For use with a rotameter having a vertical metering tube and having an extension chamber disposed co-axially with said metering tube and having a metering float, said float having a flow-constricting head portion disposed within said metering tube and having an elongated body portion disposed within said extension chamber; means for indicating the position of said metering float, said last-mentioned means including a pair of co-axial end-to-end bar magnets disposed within said body portion, said magnets having similar poles disposed substantially in juxtaposition, a follower bar magnet mounted outside said extension chamber and having one pole disposed adjacent thereto, said adjacent pole being magnetically opposite to said juxtaposed poles and forming a magnetic couple therewith, a counter-weighted lever mounting for said follower magnet whereby said follower magnet can move responsive to movements of the float magnets, and means for actuating said indicating means responsive to tilting of said lever mounting.

8. For use in a rotameter having a vertical metering tube and having a metering float adapted for up-and-down movement responsive to variations in rate-of-flow of fluid through said tube and having an indicator; means for magnetically coupling said float to the said remote indicator, said last-mentioned means including a pair of co-axial end-to-end bar magnets carried by said float and movable therewith, said magnets having similar poles disposed substantially in juxtaposition, and a follower magnet having one pole disposed adjacent the path of travel of the float magnets, said adjacent pole being magnetically opposite to said juxtaposed poles and forming a magnetic couple therewith, a counter-weighted lever mounting for said follower magnet whereby said follower magnet will move responsive to movements of the float magnets, and means for actuating said indicator responsive to tilting of said lever mounting.

9. For use in a rotameter having a vertical metering tube and having a metering float adapted for up-and-down movement responsive to variations in rate-of-flow of fluid through said tube and having an indicator; means for magnetically coupling said float to the said remote indicator, said last-mentioned means including an elongated extension carried by said float and movable therewith, a pair of co-axial end-to-end bar magnets disposed within said extension, said magnets having similar poles disposed substantially in juxtaposition, a follower magnet having one pole adjacent the path of travel of said first-mentioned magnets, said last-mentioned pole being magnetically opposite to said juxtaposed poles and forming therewith a magnetic couple whereby said follower magnet will move with the float extension, and means for actuating said indicator responsive to movements of said follower magnet.

10. For use with a rotameter having a vertical metering tube and having an extension chamber disposed coaxially with said metering tube and having a metering float, said float having a flow-constricting head portion disposed within said metering tube and having an elongated body portion disposed within said extension chamber; means for indicating the position of said metering float, said last-mentioned means including a pair of co-axial end-to-end bar magnets disposed within said body portion, said magnets having similar poles disposed substantially in juxtaposition, the length of each of said end-to-end bar magnets being at least as great as the useful length of said metering tube, a follower bar magnet mounted outside said extension chamber and having one pole disposed adjacent thereto, said adjacent pole being magnetically opposite to said juxtaposed poles and forming a magnetic couple therewith, a counter-weighted lever mounted for said follower magnet whereby said follower magnet can move responsive to movements of the float magnets, and means for actuating said indicating means responsive to tilting of said lever mount.

11. In a system having a meter for measuring variations in a variable condition, said meter being provided with an element movable responsive to said variations, and having means for indicating the movements of said element; means for magnetically coupling said element to said indicating means, said coupling means including a pair of co-axial end-to-end bar magnets carried by said element and movable therewith, the length of each of said end-to-end bar magnets being at least as great as the extent of movement of said metering element, said magnets having similar poles disposed substantially in juxtaposition, a follower magnet having one pole disposed adjacent the path of travel of said first-mentioned magnets, said adjacent pole being magnetically opposite to said juxtaposed similar poles and forming a magnetic couple therewith, a counter-weighted lever mounting for said follower magnet whereby said follower magnet can move responsive to movements of said first-mentioned magnets, and means operatively connecting said lever mounting to said indicating means for actuating said indicating means responsive to tilting of said lever mounting.

NATHANIEL BREWER.

REFERENCES CITED

The following references are of record in the file of this patent:

UNITED STATES PATENTS

| Number | Name | Date |
|---|---|---|
| 1,215,129 | Edlich | Feb. 6, 1917 |
| 2,260,516 | Gerber | Oct. 28, 1941 |

FOREIGN PATENTS

| Number | Country | Date |
|---|---|---|
| 636,699 | Germany | Nov. 26, 1932 |